June 7, 1955 J. MAURER ET AL 2,709,852
DENTAL HAND TOOL
Filed Jan. 10, 1951 2 Sheets-Sheet 1
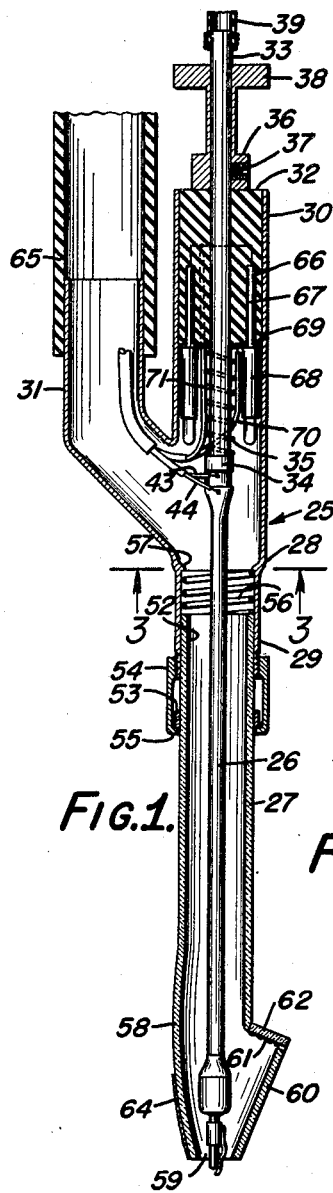
FIG.1.
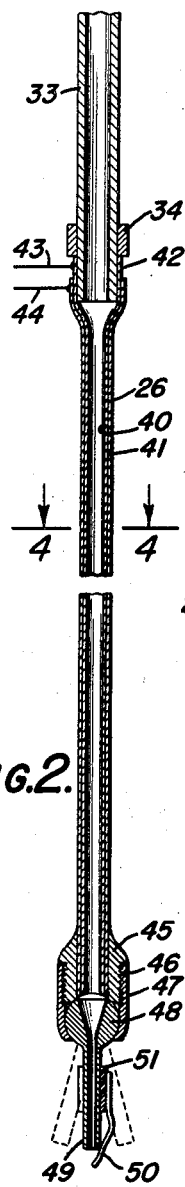
FIG.2.
FIG.3.
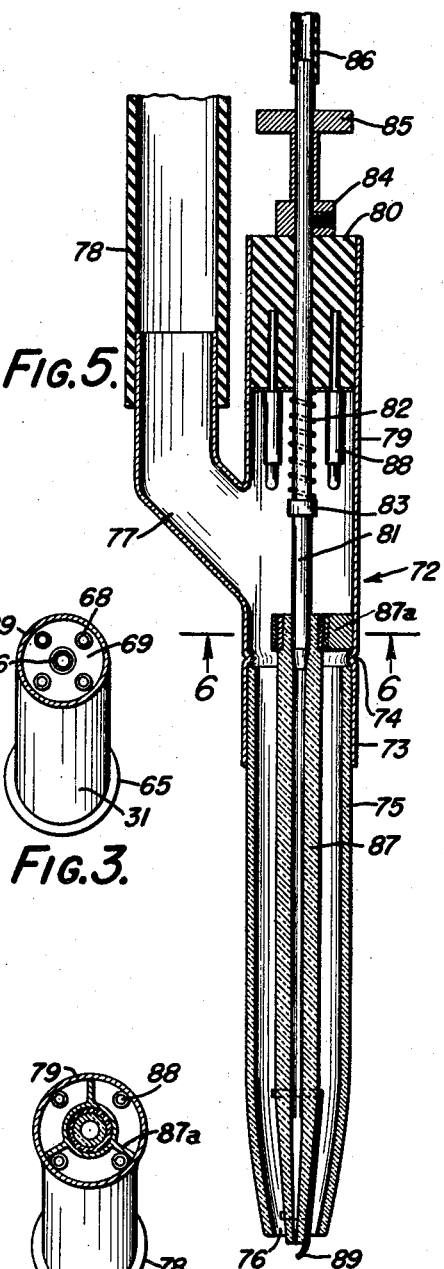
FIG.5.
FIG.6.
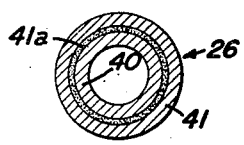
FIG.4.
INVENTORS.
JAKOB MAURER
AND ROBERT MAURER
BY
THEIR ATTORNEY June 7, 1955 J. MAURER ET AL 2,709,852
DENTAL HAND TOOL
Filed Jan. 10, 1951 2 Sheets-Sheet 2
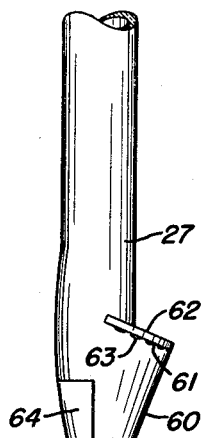
FIG. 7.
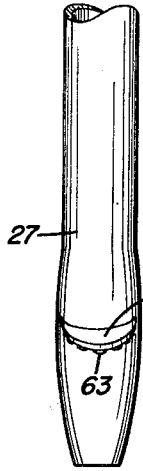
FIG. 8.
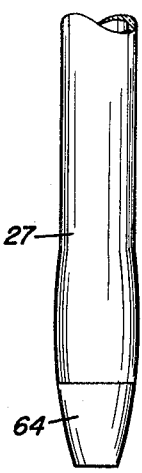
FIG. 9.
FIG. 10.
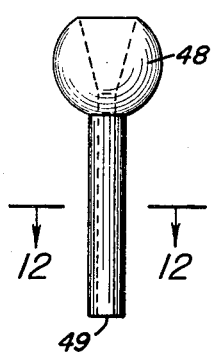
FIG. 11.
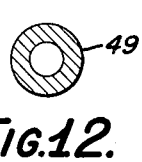
FIG. 12.
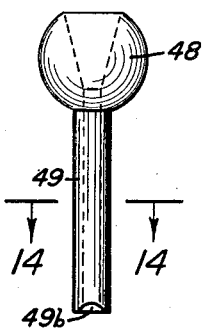
FIG. 13.
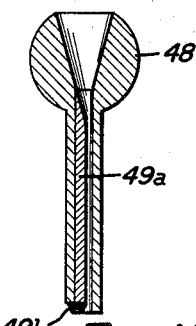
FIG. 15.
FIG. 14.
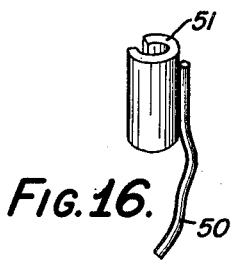
FIG. 16.
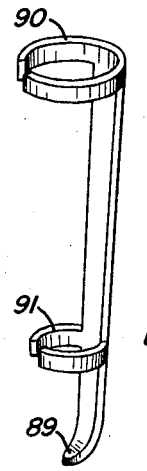
FIG. 17.
INVENTORS.
JAKOB MAURER
AND ROBERT MAURER
BY
THEIR ATTORNEY

United States Patent Office 2,709,852
Patented June 7, 1955

2,709,852

DENTAL HAND TOOL

Jakob Maurer, Rochester, N. Y., and Robert Maurer, Zurich, Switzerland, assignors to Ritter Company, Inc., Rochester, N. Y., a corporation of Delaware Application January 10, 1951, Serial No. 205,302

Claims priority, application Switzerland January 13, 1950

6 Claims. (Cl. 32—58)

This invention relates to dental hand tools for operating on tooth surfaces to cut and shape the same. It has been proposed, in the patent to Jakob Maurer No. 1,664,369, to employ a blast of fluid under pressure containing abrasive particles and operating in the manner of the known sand blast, to accomplish the work previously done by burrs, drills and the like. The said patent discloses means for applying the abrasive material through one hand tool, and for withdrawing the abrasive material through another tool or instrument, such as a hollow, perforated ring surrounding the mouth of the patient and subjected to a sub-atmospheric pressure. Such instrumentalities are advantageous in the elimination of the rotation or vibration of parts characteristic, for example, of the known dental engine, and the increased pain thereby caused the injured nerves, as well as in the increased speed at which the work may be accomplished, so that the discomfort to the patient is substantially reduced. However, the instrumentalities heretofore provided for operating in this manner upon the teeth have been relatively cumbersome and we have found that such instrumentalities may be very materially altered and improved, as heretofore described.

One object of the invention, therefore, is to provide an improved hand piece or tool for the above purpose having a more unitary, efficient and convenient construction and mode of operation.

Another object is to supply a unitary hand tool for the purpose described combining in a single instrument both the means for projecting the abrasive stream and for withdrawing it from the mouth after contact with the tooth surface.

Another object is to provide such a tool with convenient and effective means for illuminating the working portion of the tool and the tooth surface upon which it operates.

Another object is to provide such a tool at its nozzle end with a needle element for engaging and exploring the tooth surface to be operated upon and for indicating the path of the abrasive stream and guiding the work of the operator.

A further object is to provide a hand piece of the above nature with efficient means for heating the stream of abrasive carrying fluid as it passes through the tool, to reduce the discomfiture to the patient.

Still a further object is to provide a hand tool having the above advantages in a simple and practical form of construction adapted to be readily manufactured and maintained in efficient operating condition.

To these and other ends the invention resides in certain improvements and combinations of parts, all as will be hereinafter more fully described, the novel features being pointed out in the claims at the end of the specification.

In the drawings:

Fig. 1 is a central, longitudinal, sectional view of a hand tool embodying the present invention;

Fig. 2 is an enlarged, central, sectional view of an inner tubular member and nozzle detached from the instrument, as shown in Fig. 1;

Fig. 3 is a transverse, sectional view substantially on the line 3—3 in Fig. 1;

Fig. 4 is an enlarged, transverse, sectional view on the line 4—4 in Fig. 2;

Fig. 5 is a view similar to Fig. 1, but showing a modified construction;

Fig. 6 is a transverse, sectional view on the line 6—6 in Fig. 5;

Fig. 7 is a side elevation, partly broken away, of the nozzle end of an outer tubular member shown in Fig. 1;

Fig. 8 is a similar view of the same as seen from the right in Fig. 7;

Fig. 9 is a similar view of the same as seen from the left in Fig. 7;

Fig. 10 is a view of the lower or nozzle end of the member shown in Figs. 7, 8 and 9;

Fig. 11 is an enlarged, side elevation of adjustable nozzle means shown in Fig. 2 and detached therefrom;

Fig. 12 is an enlarged, sectional view on the line 12—12 in Fig. 11;

Fig. 13 is an elevation of nozzle means such as shown in Fig. 11 but in slightly modified form;

Fig. 14 is an enlarged, sectional view on the line 14—14 in Fig. 13;

Fig. 15 is a central, sectional view on the line 15—15 in Fig. 13;

Fig. 16 is an enlarged, perspective view of a needle element for the inner nozzle shown in Fig. 1, and Fig. 17 is a similar view of a modified needle element shown in Fig. 5.

The preferred embodiment of the invention, herein disclosed by way of illustration, provides a unitary hand piece or tool comprising a body indicated generally at 25 (Fig. 1), carrying inner and outer tubular members, 26 and 27, respectively. These members are mounted in concentrically spaced relation, as shown, so as to provide separate inner and outer passageways in the respective tubes which terminate in juxtaposed nozzles, as hereafter described. Means are provided, in connection with the opposite end of the inner tubular member 26 for supplying fluid under pressure containing known and suitable abrasive material or particles for projection against a tooth surface, to shape it by abrasion, in the manner of operation of the known sand blast, while the opposite end of the outer tubular member 27 is connected with means for maintaining therein a lower and preferably sub-atmospheric pressure, for withdrawing by suction the pressure fluid and the abrasive and abraded materials, as hereafter further described.

Handpiece body 25 preferably comprises a tubular metal portion 28, suitably formed of sheet metal with a tubular end 29 for the reception of the outer tubular nozzle member 27, the opposite end of portion 28 being branched to form tubular terminals, 30 and 31, the one being provided with means for connection with the fluid pressure supply and the other with means for connection with the low pressure source. As shown, the inner tubular member 26, for supplying the abrasive pressure stream, is carried in the branch 30 of the hand piece and extends through the outer tubular member 27, as will now be further described.

The tubular branch 30 of the body has tightly fitted or otherwise fixed therein a cylindrical plug 32, of rubber or similar insulating material, having a central bore slidably receiving a tube portion 33. Portion 33 has fixed thereon, near its inner end, a collar 34 and a coiled compression spring 35 tends to move the tube inwardly, while an elongated collar 36, adjustably fixed to the tube by a set screw 37, adjustably limits the action of the spring in positioning the tube and its discharge nozzle. Collar 36 carries a finger piece or knob 38, by means of which the collar may be manipulated during adjustment and by means of which also the tubular portion 33 may be adjustably rotated in situ, to suitably position the discharge nozzle of member 26, as hereafter described. Tubular portion 33 projects beyond the knob 38 for the reception of a flexible tube 39, of rubber or the like, forming part of the means for supplying the abrasive pressure stream to the instrument, as further described hereafter.

The inner tubular member 26 for conducting the abrasive stream is preferably provided with electric heating means, for which purpose it is formed, in the present instance, with double metal inner and outer walls, 40 and 41 (Fig. 2), of eletrically conducting material, insulated from each other by a coating on one or both of insulating material 41a (Fig. 4), as shellac or the like. The outer ends of the walls 40 and 41 are soldered, welded or otherwise electrically connected with each other, while their inner ends are fitted over the adjacent end of the tubular portion 33 to which the inner wall is fixed. The inner wall 40 is extended beyond the outer wall 41, as at 42, and the walls are provided with electrical terminals, 43 and 44, for connection with a source of electrical current, for heating the walls which are formed of material having a suitable electrical resistance for that purpose, as well understood in the art. The connections 43 and 44 are preferably carried in a self-contained manner through the branch 31 of the hand piece to the power source.

The other or nozzle end of inner tubular member 26 is preferably provided with an enlargement or head 45 (Figs. 2, 11 and 12) formed with an exteriorly threaded end 46, as shown. Screwed on this head is a sleeve 47 and the ends of the head and sleeve are shaped to form a retaining seat or socket for a substantially ball-shaped element 48, as shown. This element is extended to provide a tubular discharge nozzle 49, the bore of which extends through the element 48 to maintain communication between the nozzle and tubular member 26. The movement of element 48 in its socket is frictionally restrained by sleeve 47 so that the nozzle 49 may be adjustably positioned and frictionally retained in such position, as may be found desirable in use.

Nozzle 49 may have its bore reduced in size and suitably shaped by the insertion of a filler strip, as 49a and may be notched, as at 49b, to turn the discharged blast laterally, as shown in Figs. 13, 14 and 15. Other directing shapes of the nozzle end will readily occur to those skilled in the art.

Nozzle 49 for the abrasive stream is preferably provided with a needle-like finger 50 (Figs. 2 and 16), mounted on a sleeve 51 tightly fitted on the nozzle. This finger 50 has its point positioned to extend concentrically with and a slight distance in advance of the nozzle, as shown, so as to afford both a probing point for exploring the condition of tooth surfaces and also an indicator of the path of the abrasive stream, to serve as a guide to the operator in directing the operation thereof.

The outer tubular member 27 is preferably formed of moldable, plastic, light-transmitting material, such, for example, as Lucite, its inner end 52 being slidably mounted in the tubular end 29 of the hand tool body 25. Preferably, tube 27 has fixed thereon a collar 53 and a sleeve 54, threaded on the end 29 of the body, has its free end turned inwardly as at 55 to limit the outward movement of the collar 53 and the member 27. A coiled compression spring 56, bearing at one end against a shoulder 57 on the body, has its other end in bearing engagement with the inner end of member 27 to project the member 27 and permit it to yield under pressure against the tooth surface, or a protective template which may be placed on the tooth around the operating area.

The outer or nozzle end of tubular member 27 may be slightly enlarged, as at 58, and has an open nozzle end 59 of restricted diameter, as shown. This nozzle end is preferably flared outwardly on one side, as at 60, to produce an open shoulder portion 61 which is covered by a plate 62 of transparent material through which the operator may observe the inner discharge nozzle and its guide needle 50. These parts are best shown in Figs. 7 to 10, inclusive, from which it will be seen that the edges of the opening in shoulder 61, under plate 62, are formed with a series of inlet openings or notches, 63, to permit the inflow of air and deflect and reduce the impact of abrasive particles against the under side of the plate. The wall of member 27 may be supplied, as at its rear portion, with a suitable reflecting surface 64 for reflecting the light toward the operating area.

Tubular member 27 communicates with branch 31 of the body, the outer end of which is adapted for the attachment of a flexible conductor 65 forming part of a suitable means for maintaining a lower and preferably sub-atmospheric pressure in member 27 and at its nozzle 59, for withdrawing and discharging the pressure fluid and abrasive particles and tooth cuttings from the operating area. It will be seen that spaced tubular members 26 and 27 thus provide separate concentric passageways for supplying the pressure fluid and abrasive particles in an abrasive blast from the inner nozzle 49 and for withdrawing the same, along with tooth cuttings, through the nozzle 59 and member 27, so that the means for supplying and discharging the abrading stream are compactly and effectively combined in a unitary, convenient hand tool.

The hand tool is also supplied with self-contained means for illuminating the nozzles and working area, for which purpose plug 32 of the body 25 is formed with a plurality of sockets 66 (Figs. 1 and 3) for receiving and retaining the terminal posts 67 of electrical lamps 68, the terminal casings of which are in contact with an electrical conducting plate 69 on the inner end of plug 32. This plate is connected with one wire 70 of an electrical circuit having its other wire 71 carried through and insulated from plate 69 and connected through plug 32 with the terminal posts 66 of the lamps. These circuit wires are also preferably carried in self-contained fashion through the branch 31 of the body, as shown.

The light from lamps 68 is reflected from the inner surfaces of body 25 and enters the passageway through sleeve 27 as well as the inner end of the sleeve wall, being transmitted through the sleeve and through the light-transmitting material of which it is formed so as to be projected beyond the nozzle 59, to thereby effectively illuminate the nozzles and the working area. The hand piece is thus equipped with self-contained illuminating means to aid the vision and facilitate the work of the operator.

A modified form of the invention is shown in Fig. 5 in which the body 72 of the hand tool is constructed as described above, except that its tubular end 73 is formed with an inwardly extending shoulder 74. Fitting in this end of the body, and frictionally retained therein, is the outer tubular member 75, made of light-transmitting material, as described above. This member is of plane, cylindrical shape, and has at its outer end a nozzle 76 with an intake opening of somewhat restricted size, as shown. Member 75 provides a passageway communicating through branch 77 of the body with suction means including the tubular connection 78 therewith, as already described.

Branch 79 of the body carries a plug 80 of insulating material, in which is slidably mounted a tubular portion 81 as described above. This tubular portion is equipped with spring means 82 operating against a collar 83 on portion 81 and against a metal plate on plug 80, as described above, with a similar adjustable collar 84 and finger piece 85. One end of tubular portion 81 is similarly connected with tubular means 86 forming a part of a device for supplying the abrasive stream and the other end portion 81 is fixed to the inner tubular member 87 which carries a spider 87a slidable in the outer member 75.

In this modification, however, both the inner tubular member 87 and the outer member 75 are preferably formed of light-transmitting material, as described, and the plug 80 carries lamps 88, mounted and connected as described above, for projecting light through the passageways of the tubes 75 and 87 and through their side walls, so as to conduct the rays to the nozzles and the working area, as described above. In this modification, the heating means for the inner member 87 may be omitted, but its nozzle end carries a probing and indicating finger or point 89 (Figs. 5 and 17) as in the case of the first modification, the finger being preferably formed of sheet metal and carrying spaced arm means 90 and 91 for embracing the tubular member and retaining the finger thereon.

The means for supplying the stream of fluid pressure and abrasive material and for regulating the same may be of any known and suitable nature, such, for example, as that disclosed in the said Maurer Patent No. 1,664,369, and the suction means may be any valve regulated source of reduced pressure. If desired, such mechanisms may include the treadle or other known and suitable control devices as disclosed in said patent, together with the means therein disclosed for simultaneously regulating the heating of the instrument, such means forming no part of the present invention.

The operation of the device has been described above in connection with the description of its construction from which it is evident that the invention provides an efficient hand tool for performing the dental operating process described in said Maurer Patent No. 1,664,369, and one of a more self-contained and unitary character in which the abrasive stream and the means for its withdrawal are efficiently and conveniently combined in a single tool which, furthermore, is provided with self-contained means for illuminating the tool nozzles and the operating area of the tooth surface. In addition, our improved hand tool includes means for heating the abrasive stream to comfortable body temperature, as well as a probing and indicating needle for the guidance of the operator, such improved features all contributing greatly to the efficient and skillful practice of the process described in said patent.

Parts of the construction herein disclosed are disclosed and claimed in our copending application, Serial No. 212,222, now Patent No. 2,643,456.

It will thus be seen that the invention accomplishes its objects and while it has been herein disclosed by reference to the details of preferred embodiments, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

We claim:

1. A dental hand tool for shaping tooth surfaces, said tool having an elongated body of relatively small size in cross section adapted for insertion in the mouth and formed with separate passageways therethrough terminating in nozzles in juxtaposed relation, means on said body for connecting one of said passageways with a source of fluid under pressure containing abrasive material for projecting the same through the nozzle thereof against a tooth surface, said nozzle for abrasive material having an opening which is small relative to the area of the tooth for confining a jet of said material to particular portions of said tooth, means on said body for connecting the other of said passageways with a source of lower pressure for withdrawing said fluid and material through the nozzle thereof after abrading contact with said tooth surface, and a lamp enclosed by said body and arranged to illuminate said nozzles and the toothed surface to be shaped.

2. A dental hand tool for shaping tooth surfaces, said tool having an elongated body of relatively small size in cross section adapted for insertion in the mouth and formed with separate passageways therethrough terminating in nozzles in juxtaposed relation, means on said body for connecting one of said passageways with a source of fluid under pressure containing abrasive material for projecting the same through the nozzle thereof against a tooth surface, said nozzle for abrasive material having an opening which is small relative to the area of a tooth for confining a jet of said material to particular portions of said tooth, means on said body for connecting the other of said passageways with a source of lower pressure for withdrawing said fluid and material through the nozzle thereof after abrading contact with said tooth surface, and a lamp enclosed by said body, said body having a part made of light-transmitting material arranged to transmit light from said lamp and illuminate said tooth surface.

3. A dental hand tool for shaping tooth surfaces, said tool having a body comprising inner and outer tubular members in concentrically spaced relation with each other to form separate passageways with said members terminating in juxtaposed nozzles, means on said body connecting one of said passageways with a source of fluid under pressure containing abrasive material for projecting the same through the nozzle thereof against a tooth surface, means on said body for connecting the other of said passageways with a source of pressure lower than that in said first mentioned passageway for withdrawing said fluid and material through the nozzle of said other passageway after abrading contact with said tooth surface, one of said tubular members being made of light-transmitting material and a lamp on said body arranged to project light through said light-transmitting member to illuminate said nozzles and tooth surface.

4. A dental hand tool for shaping tooth surfaces, said tool having a body comprising inner and outer tubular members in concentrically spaced relation with each other to form separate passageways with said members terminating in juxtaposed nozzles, means on said body for connecting one of said passageways with a source of fluid under pressure containing abrasive material for projecting the same through the nozzle thereof against a tooth surface, means on said body for connecting the other of said passageways with a source of sub-atmospheric pressure for withdrawing said fluid and material through the nozzles of said other passageway after abrading contact with said tooth surface, said outer tubular member being made of light-transmitting material, and a lamp on said body arranged to project light through said outer member to illuminate said nozzles and tooth surface.

5. A dental hand tool for shaping tooth surfaces, said tool having a body comprising inner and outer tubular members in concentrically spaced relation with each other to form separate passageways with said members terminating in juxtaposed nozzles, means on said body for connecting one of said passageways with a source of fluid under pressure containing abrasive material for projecting the same through the nozzle thereof against a tooth surface, means on said body for connecting the other of said passageways with a source of sub-atmospheric pressure for withdrawing said fluid and material through the nozzle of said other passageway after abrasive contact with said tooth surface, means for heating said inner member, said outer member being made of light-transmitting material, and a lamp on said body arranged to transmit light through said outer member to illuminate said nozzles and tooth surface.

6. A dental hand tool for shaping tooth surfaces comprising an elongated body of relatively small size in cross section adapted for insertion in the mouth and formed with a passageway therethrough and terminating in a nozzle, means connected with said body for communication with said passageway and adapted for connection with a source of fluid under pressure containing abrasive material for projecting the same through said passageway and the nozzle thereof against a tooth surface, said nozzle for abrasive material having an opening which is small relative to the area of a tooth for confining a jet of said material to particular portions of said tooth said body being provided adjacent said nozzle with a pointed element for exploring said tooth surface and indicating the point of contact of said projected fluid with said tooth surface and lamp means enclosed in said body and arranged to illuminate said nozzle, exploring element and said tooth surface to be shaped.

References Cited in the file of this patent

UNITED STATES PATENTS

| | | |
|---|---|---|
| 1,664,369 | Maurer | Mar. 27, 1928 |
| 2,455,514 | Mead | Dec. 7, 1948 |
| 2,483,176 | Bishop | Sept. 27, 1949 |
| 2,539,828 | Goldis et al. | Jan. 30, 1951 |